(No Model.) 4 Sheets—Sheet 2.

W. A. H. BOGARDUS.
RECORDING THERMOMETER.

No. 368,319. Patented Aug. 16, 1887.

WITNESSES:

INVENTOR
W. A. H. Bogardus
BY H. J. England.
his ATTORNEY (No Model.) 4 Sheets—Sheet 4.
W. A. H. BOGARDUS.
RECORDING THERMOMETER.
No. 368,319. Patented Aug. 16, 1887.
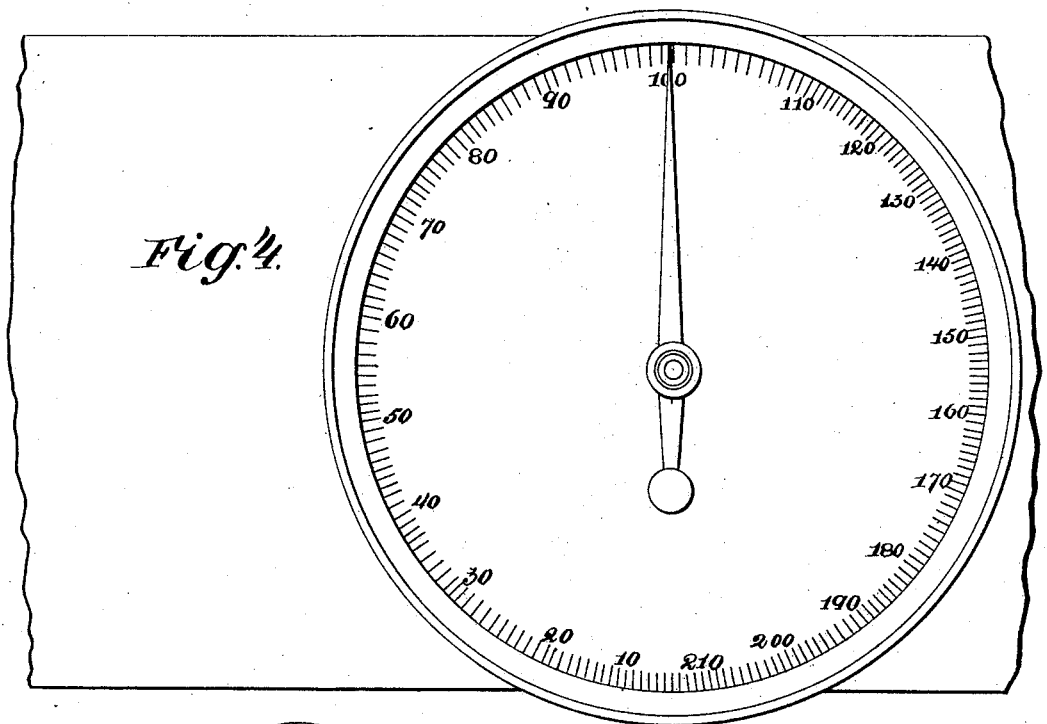
Fig. 4.
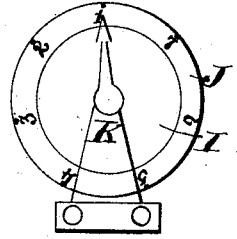
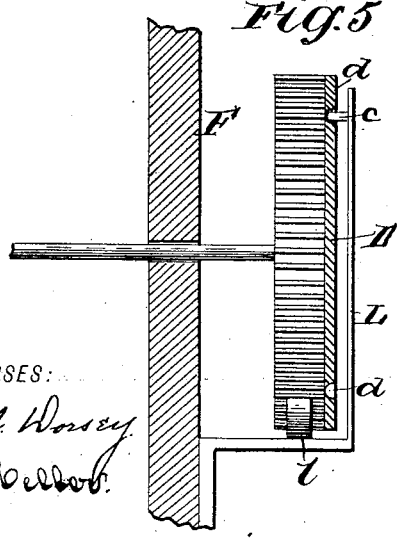
Fig. 5.
WITNESSES:
Vernon M. Dorsey
Fred Shellot
INVENTOR
W. A. H. Bogardus
BY H. J. England.
his ATTORNEY

UNITED STATES PATENT OFFICE.

WASHINGTON A. H. BOGARDUS, OF NEW YORK, N. Y.

RECORDING-THERMOMETER.

SPECIFICATION forming part of Letters Patent No. 368,319, dated August 16, 1887.

Application filed May 17, 1887. Serial No. 238,551. (No model.)

*To all whom it may concern:*

Be it known that I, WASHINGTON A. H. BOGARDUS, a citizen of the United States, residing at New York city, in the county of New York and State of New York, have invented certain new and useful Improvements in Recording-Thermometers; and I do hereby declare the following to be a full, clear, and exact description of the invention, such as will enable others skilled in the art to which it appertains to make and use the same.

My invention relates to recording-thermometers, and especially to that class known as "self-recording thermometers," and the object is to continuously record the various fluctuations in the temperature of the atmosphere and the temperature of the air inside a refrigerator tank or car or record the temperature of any room, and acts as a check, detector, or monitor on the acts of engineers and employés; and to this end my invention consists in pivoting an arm to a shaft connected by suitable mechanism to the free end of a metallic strip, whereby the expansion and contraction of the said strip will move the arm in opposite directions, the end of the arm having a tracing needle or point in contact with a removable chart, whereby the movement of the pointed arm is recorded. I attain these objects by means of the peculiar construction and arrangement of the various parts of my device, which will be more fully pointed out and described in the specification and claims.

As illustrating the details and mode of constructing the apparatus for this purpose, reference is to be had to the accompanying drawings, forming a part of this specification, in which similar letters of reference indicate corresponding parts in all the figures.

Figure 1:
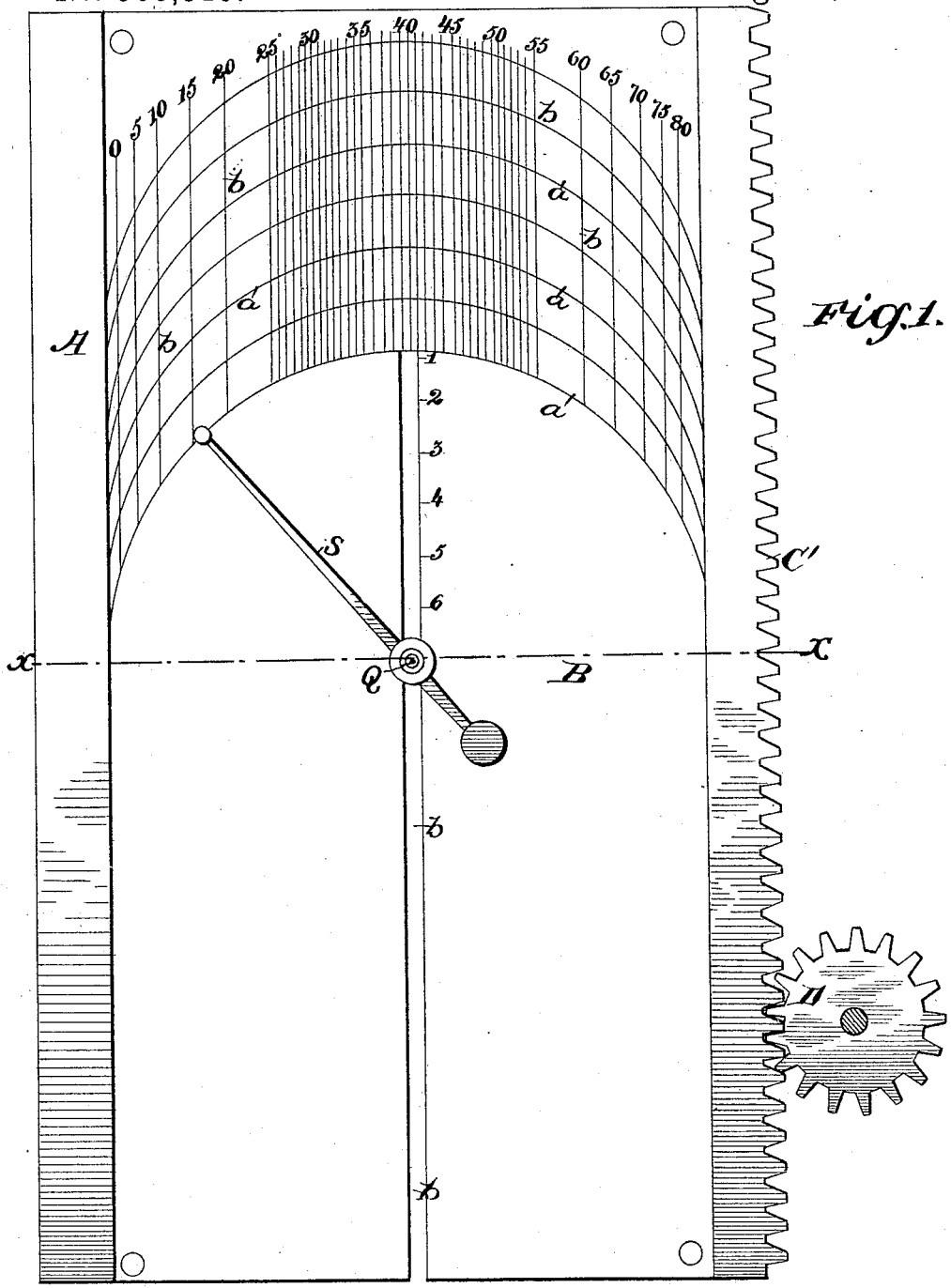
Figure 2:
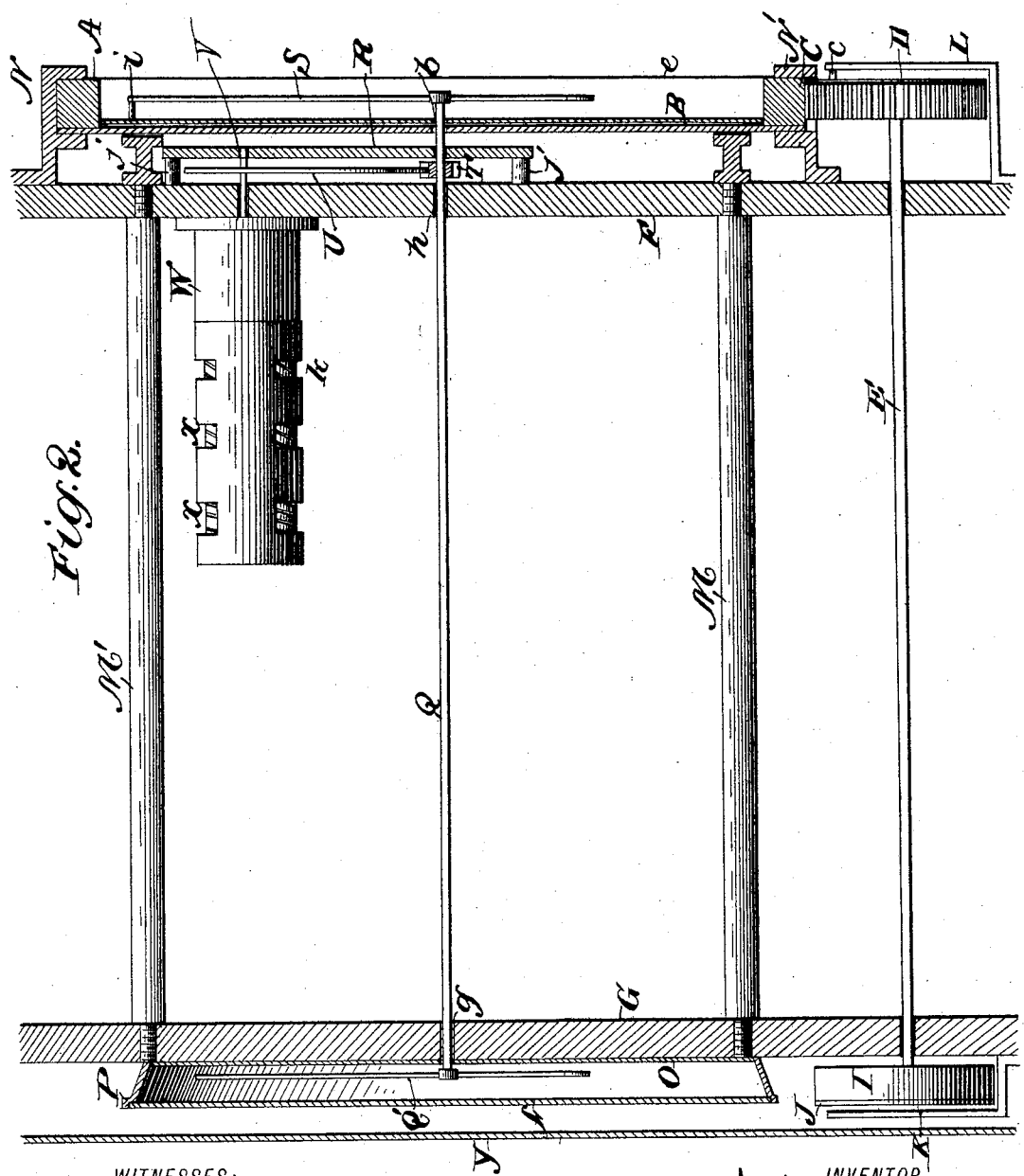
Figure 3:
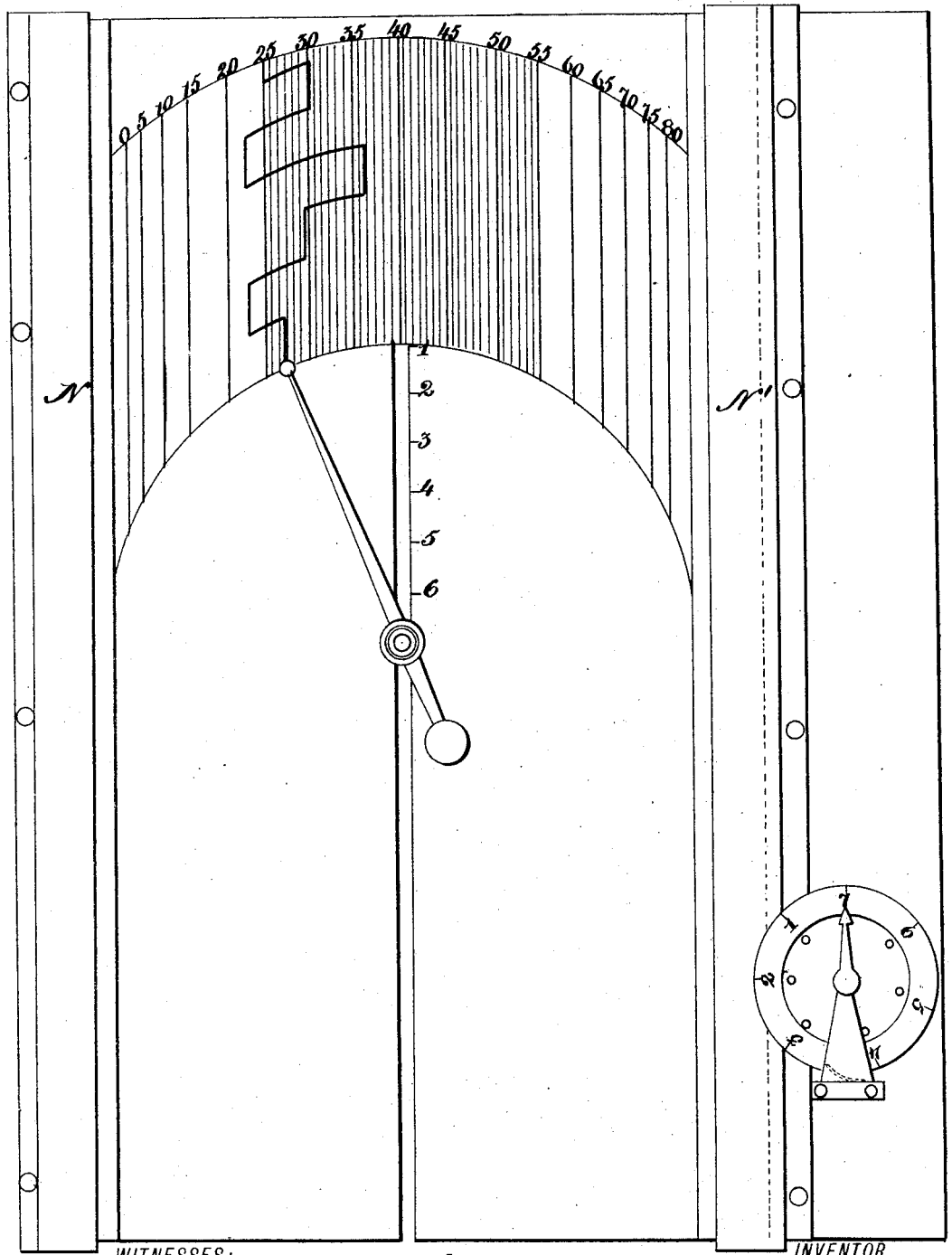

Figure 1 is a front elevation of the chart and carriage detached of my invention. Fig. 2 is a horizontal cross-section on line *x x* of Fig. 1. Fig. 3 is a front elevation shown on the inside of car. Fig. 4 is a front elevation showing dial and regulator. Fig. 5 is an enlarged detail view of actuating gear-wheel.

Referring to the drawings, A represents a frame, upon one face of which is secured a sensitive chart, B, that at one end of its face is provided with a series of curved lines, *a*, extending horizontally; also a series of straight lines extending vertically and numbered from 0 to 80 to show the different degrees of temperature. In the central portion of the chart the lines are arranged in close proximity to each other to indicate fractions of degrees. This chart may be made of any suitable material that is susceptible of impressions by pen, pencil, tracing-needle, or other implement, and the four corners are perforated to receive attaching-pins to hold the same to frame A. The central portion of said chart C is provided with a central slot, *b*, and one edge of said slot is provided with a series of numbers from 1 up to any number desired, these numbers being designed to represent stations when the thermometer and recorder are used on refrigerator-cars in transit from starting-point to terminal point, or from one station to another, and when used as stationary monitors or detectors in cold storage houses or tanks or for engineers or watchmen they may represent hours, days, or times of change for icing or otherwise.

One edge of frame A is provided with a series of gear-teeth, C', that are formed to mesh or gear with a series of teeth formed on gear-wheel D, by means of which plate A is moved vertically. Gear-wheel D is rigidly secured to shaft E, which is journaled on standards F and G of frame H near their ends, and the opposite end of said shaft is rigidly secured to wheel I, having a milled edge and a front circular dial, J, provided with figures from 1 to any desired number to correspond to the same on chart B.

An angular arm, K, is secured to standard G below wheel I, its free end extending upward across the dial J, which serves to indicate the position of wheel D and the chart B when the desired figure is opposite the free end of arm J.

An angular arm, L, is secured to standard F below gear-wheel D, and its free end extends across the outer face of the same, and is provided with an oval inward projection, *c*, adapted to spring into oval concavities *d*, formed in the outer face of wheel D, each concavity being numbered to correspond with the numbers on wheel J and chart B. The arm L is arranged with sufficient spring to force the projection *c* into the concavities *d*, yet permit the wheel D to be turned by revolving the shaft E.

The cross-pieces M and M' are stiffening-rods between the standards F and G or walls of the refrigerator tank or car.

The sides of frame A are loosely held by guides N and N', which are secured to the outside of standard or frame F, and over the chart B is removably secured a plate of glass, e.

On the outer face of standard G is secured a dial-face, O, a short distance above wheel I, having graduating-marks and numbers arranged in circular form as a standard thermometer, the same being provided with a case, P, and glass front f. The dial O has a central perforation, g, which extends through the wall G, and in a direct line opposite a similar perforation, h, extends through the wall F. A shaft, Q, having an index-hand, Q', rigidly secured to its outer end, extends through perforations g and h, through the cross-bar R and central slot b, and terminates a short distance from the outer face of chart B, where said shaft is rigidly secured to an index-hand, S. The long end of said hand has an inward-projecting tracing needle, pencil, pen, or other suitable device, i, that will mark or scratch on the surface of chart B when the index-arm S is moved.

Cross-bar R is secured to standard or wall F by projections j, which form a space between the wall F and the inner face of cross-bar R, and within this space a gear-wheel, T, is rigidly secured to shaft Q, which is formed to gear with the toothed end of pendulum-lever U, that is secured near its opposite end to shaft V. Said shaft is journaled in the wall F and cross-bar R, and extends centrally into cylinder W, which is provided with open cross-slots K, formed for the free admission of air.

Cylinder W surrounds a coil of flat metal, x, one end of which is secured to the free end of said cylinder and the opposite end to the inner end of shaft V, the opposite end of cylinder W being secured to the inner face of wall F. The expansion or contraction of the coil x inside case W by contact with the warm or cold air inside the refrigerator car or tank rotates the shaft V in opposite directions, according to the temperature within the same, by expanding or contracting the metal, x, causing the lever U to act on the gear-wheel T, thus rotating the shaft Q, moving the index-hands S and Q', causing the marker or tracing-needle i to act on the chart B, leaving a mark by the elastic pressure of hand S on the line of curvature traveled by the point i on the hand S. Simultaneously with this movement, by means of the rotation of shaft Q, the index-hand Q' will point to the figures on dial O, indicating the temperature within the tank or refrigerator-car, by which may always be noted by the attendant, without exposing the inside of the tank or car, the variable temperature of the atmosphere. The case P and wheel I are inclosed in a suitable case, Y, with hinged or sliding door.

Gear-wheel D is provided with a suitable spring-pawl, l, as fully shown in Fig. 5, that is preferably secured to the frame L by bolt or other suitable means, its outer end impinging against the teeth in said wheel, the object being to prevent the accidental rotation of wheel D, yet, when desired, the pawl l can be sprung away from the wheel, leaving it to turn freely in either direction; or, when in use, the attendant can turn the wheel D from right to left, but not reverse from left to right, thereby making a certainty of action in the direction desired.

The operation is as follows: The devices above described are arranged in a refrigerator-car. The wheel D is turned back, moving the frame A down until the tracing needle or pen i on index-hand S touches the chart B at the first curve under the line-figures, as shown at top of charts, Figs. 1 and 3. The shaft Q will then be at figure 1 in the slot b. The car is then charged with ice until the desired temperature is reached, which will be indicated on the dial O by the hand Q'. The car is then loaded with meat or other perishable products and closed, the hand S pointing at 5, 10, or 20 above zero, as desired, the hand Q', by means of the shaft Q, pointing to the corresponding temperature on dial O, and any variation from this temperature on the inside of the car will be traced on the chart B by the needle i and shown by the hand Q' on the dial O, so that each employé or attendant on the line of transit of said car can see the position of the hand Q', observe at what figure it points, and note the temperature of the car by opening the door Y and glancing at the position of index-hand Q'.

Employés are stationed along the line the car is moving to examine and note the temperature. The first station being reached, which will be No. 2 on chart B and dial J, after the local attendant has turned the hand-wheel I until arm K points to figure 2, the attendant opens the door Y and notes the temperature, which may be 60° or 70° above, (as the ice is consumed.) He then charges the car with ice, reducing the temperature to the desired limit, and then revolves the wheel I until the hand K points to the next figure on dial J and the gear-wheel D has moved the frame A, carrying chart B, up until the shaft Q is opposite figure 2 on said chart. Then the needle or pin i, having described the varying temperature, marks the course or line of travel of frame A on the chart B from first to second line in a vertical direction, making a record of the passage on chart B from first to second station, and the temperature also. This shows that the attendant or employé has attended to his duty and charged the car with ice at station No. 2. Neglect on the part of the employé would be the absence of straight lines, showing the movement of frame A, and the rising of the temperature would be recorded on the chart B. The arm L presses point c into concavities d at each movement of wheel I, as the outer face of each wheel is numbered alike, so that the record appears within the cooling-chamber.

Each employé, as the car reaches his station, must move the wheel I one number, note the temperature, and charge the car with ice, so that upon the arrival of the car at its destination the agent enters the car, notes the temperature, removes the chart, replaces it by a new one, and compares the record on the chart made by the needle $i$ with the report of the employés along the line the car has run, whereby all the variations of temperature are noted, and at what points on the line; also any neglect of employés.

Having described my invention, what I claim, and desire to secure by Letters Patent, is—

1. In an apparatus for indicating and recording temperature, the combination of expansive metal suitably cased and connected to a rotating shaft, which is in turn connected to a revolving shaft having at opposite ends index and recording hands, a frame carrying a chart and moving in a vertical plane in contact with a projection secured to the recording-hand, suitable gear-wheels for moving said frame, a hand-wheel secured to shaft connected with frame-gear, a dial secured to outer face of said hand-wheel, and an indicating-arm secured in front of said dial, substantially as and for the purpose described.

2. A device for indicating the temperature of rooms and the acts of attendants, consisting of a piece of metal incased within a room or car, a rotating shaft connected therewith, which is connected to a rotating shaft extending from the inside to the outside of said room or car, the inner end secured to a recording-hand, the outer end to registering-hand, a frame carrying a ruled and numbered chart opposite the recording-hand, and a numbered dial opposite the index-hand, with suitable mechanism for setting and moving the same, substantially as set forth.

3. A device for moving a vertical frame having a numbered and ruled chart thereon, consisting of suitable gear-connection with a journaled shaft having a gear-wheel secured at one end provided with an outer face having a series of numbered cavities arranged at intervals near its periphery, a spring-arm secured in front of said face and arranged to spring into either of said cavities as the wheel is turned, a spring-pawl secured to the horizontal portion of said arm to contact with the teeth of said wheel, the opposite end of said shaft being secured to a hand-wheel having a numbered face, and an indicating-arm extending over said face, whereby when the hand-wheel is turned the frame is moved and the numbers alike moved opposite the indicating-arms at each end of the shaft, substantially as set forth.

In testimony whereof I affix my signature in presence of two witnesses.

WASHINGTON A. H. BOGARDUS.

Witnesses:
   ALFRED A. NOBLE,
   T. DUYKES WHITNEY.